(12) United States Patent
Aerts et al.

(10) Patent No.: US 11,566,710 B2
(45) Date of Patent: Jan. 31, 2023

(54) SEALS

(71) Applicant: SAINT-GOBAIN PERFORMANCE PLASTICS CORPORATION, Solon, OH (US)

(72) Inventors: Peter Aerts, Ruisbroek (BE); Benny Proost, Kontich (BE); Jan Kustermans, Brecht (BE); Wim Vandenheuvel, Machelen (BE); Marcus Grossmann, Hamburg (DE)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 103 days.

(21) Appl. No.: 16/829,543

(22) Filed: Mar. 25, 2020

(65) Prior Publication Data

US 2020/0309269 A1 Oct. 1, 2020

Related U.S. Application Data

(60) Provisional application No. 62/825,227, filed on Mar. 28, 2019.

(51) Int. Cl.
*F16J 15/3248* (2016.01)
*F16J 15/3268* (2016.01)

(52) U.S. Cl.
CPC ....... *F16J 15/3248* (2013.01); *F16J 15/3268* (2013.01)

(58) Field of Classification Search
CPC .... F16J 15/00; F16J 15/16; F16J 15/50; F16J 15/52; F16J 15/3232; F16J 15/3248; F16J 15/3252; F16J 15/3256; F16J 15/3268; F16J 15/3272

USPC .......................................... 292/345; 277/345
See application file for complete search history.

(56) References Cited

U.S. PATENT DOCUMENTS

| | | | |
|---|---|---|---|
| 3,180,650 A | 4/1965 | Liebig | |
| 4,423,878 A | 1/1984 | Escue | |
| 5,597,168 A | 1/1997 | Antonini | |
| 5,615,893 A | 4/1997 | Reagan | |
| 5,913,521 A | 6/1999 | Sangren et al. | |
| 5,947,533 A | 9/1999 | Fisher et al. | |
| 6,814,355 B2 * | 11/2004 | Bjornson | F16J 15/3488 277/358 |
| 8,448,950 B2 * | 5/2013 | Sato | F16J 15/3488 277/358 |
| 9,004,495 B2 * | 4/2015 | Vasagar | F16J 15/442 277/585 |
| 9,243,715 B2 | 1/2016 | Slack et al. | |
| 2005/0006968 A1 | 1/2005 | Beichl et al. | |

(Continued)

FOREIGN PATENT DOCUMENTS

| | | |
|---|---|---|
| CN | 102459968 B | 7/2015 |
| KR | 100631438 B1 | 10/2006 |
| WO | 2007008656 A1 | 1/2007 |

OTHER PUBLICATIONS

International Search Report and Written Opinion for PCT/US2020/024642, dated Jul. 9, 2020, 12 pages.

*Primary Examiner* — Nathan Cumar
(74) *Attorney, Agent, or Firm* — Abel Schillinger, LLP; David G Miranda (57) ABSTRACT

A seal assembly comprising: a housing defining a groove; a seal disposed in the groove of the housing; and a coupling element adapted to restrict relative movement between the housing and the seal.

18 Claims, 2 Drawing Sheets

(56) References Cited

U.S. PATENT DOCUMENTS

2009/0283974 A1 11/2009 Groom et al.
2010/0052268 A1 3/2010 Schroeder et al.
2012/0261887 A1 10/2012 Vasagar

* cited by examiner

SEALS

CROSS-REFERENCE TO RELATED APPLICATION(S)

This application claims priority under 35 U.S.C. § 119(e) to U.S. Provisional Application No. 62/825,227, entitled "SEALS," by Peter AERTS et al., filed Mar. 28, 2019, which is assigned to the current assignee hereof and incorporated herein by reference in its entirety.

FIELD OF THE DISCLOSURE

The present disclosure relates to seals.

RELATED ART

Seals can be utilized to form interfaces between similar or different fluidic components having same or variable characteristics. Industries utilizing seals continue to demand improvements in seal design and operation.

BRIEF DESCRIPTION OF THE DRAWINGS

Figures are illustrated by way of example and are not intended to be limiting by the drawings.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

The use of "approximately," "generally," and the like are employed to describe relative allowable deviation from a given value. Such terms should be read to include a deviation from the given value in a range of 1% and 10% of the value, in a range of 1% and 9% of the value, in a range of 1% and 8% of the value, or in a range of 1% and 5% of the value.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the sealing arts.

A seal assembly in accordance with one or more embodiments described herein can generally include a housing and a seal coupled to the housing. In an embodiment, the seal can be disposed in a groove of the housing and retained in place relative to the housing by a coupling element adapted to restrict relative movement between the housing and the seal. The coupling element can include, for example, a threaded fastener, a non-threaded fastener, an adhesive, a clamp, or any combination thereof. In a particular embodiment, the coupling element can include a fastener extending through the housing and seal.

In an embodiment, the seal assembly can include a split ring seal assembly (split seal assembly) defining one or more circumferential gaps. In a particular embodiment, the seal assembly includes multiple circumferential portions, such as two halves (e.g., a first half and a second half), joined together at circumferential ends. To facilitate sealing characteristics, the circumferential ends of the two halves can be adapted to fit together without producing circumferential gaps therebetween.

Figures 1, 2:
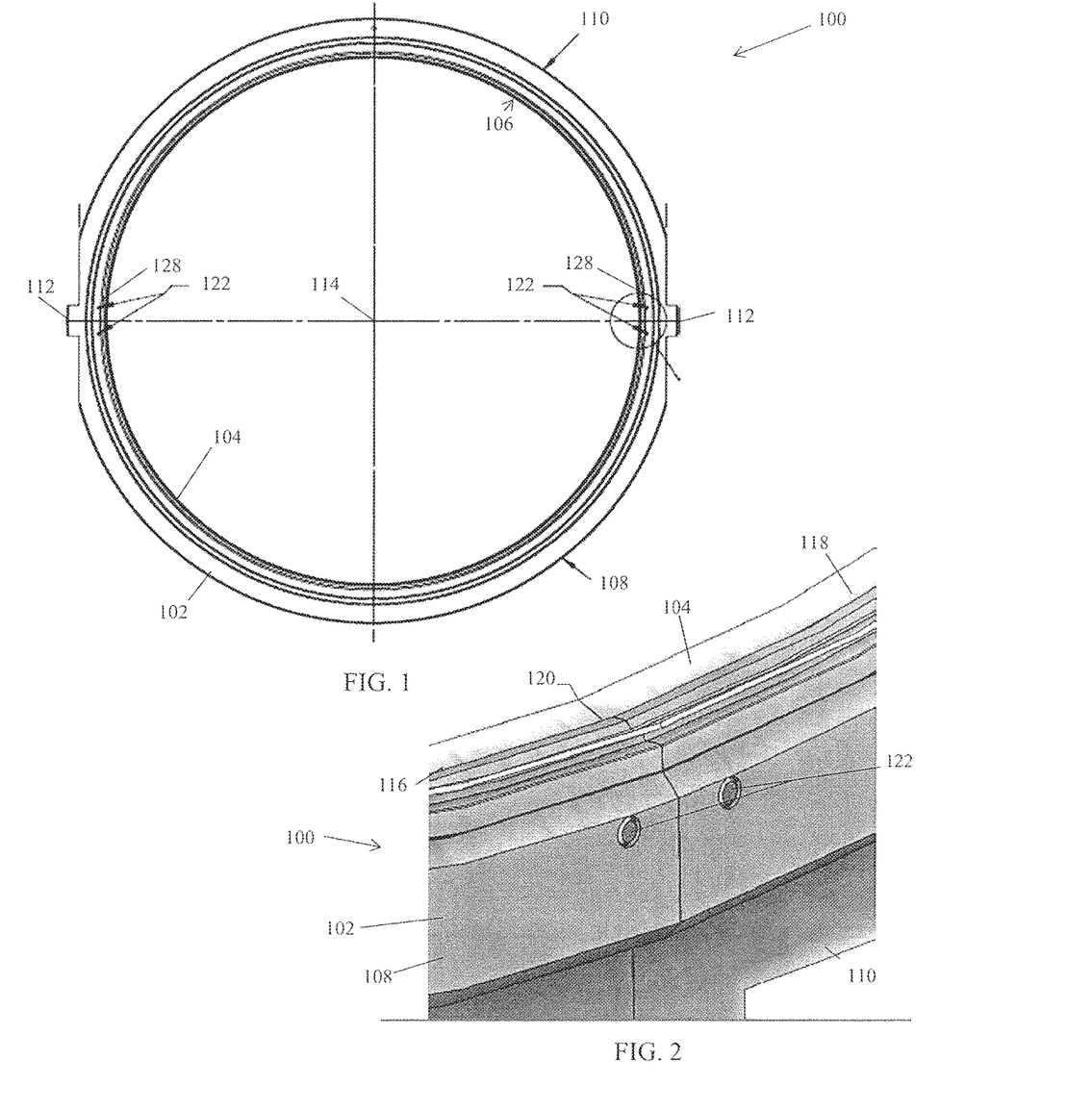
FIG. 1 includes an axial view of a seal assembly in accordance with an embodiment.
FIG. 2 includes a perspective view of a portion of a seal assembly in accordance with an embodiment.

FIG. 1 includes an axial view of a seal assembly 100 in accordance with an embodiment. The seal assembly 100 includes a housing 102 and a seal 104. The seal 104 can be disposed on an inner surface 106 of the housing 102. The seal 104 can define an inner diameter of the seal assembly 100 adapted to seal relative to an inner component (not illustrated), such as a shaft. In an embodiment, the housing 102 can be part of a bigger system, such as a shaft or crankshaft housing.

In an embodiment, the seal assembly 100 can have a multi-body construction. For example, the housing 102 can include a first portion 108 and a second portion 110. In a particular embodiment, the first portion 108 can define a first half of the housing 102 and the second portion 110 can define a second half of the housing 102. The first and second portions 108 and 110 can be discrete (e.g., not fixedly coupled together). In such a manner, the first and second portions 108 and 110 can be brought to an inner component and readily installed thereon without bending or distorting the seal assembly 100 or requiring axial displacement thereof.

The first and second portions 108 and 110 of the housing 102 can be joined together at one or more interfaces 112. In an embodiment, the interfaces 112 can be adapted to receive one or more fasteners, clamps, ties, or other engagement assemblies. Once engaged, the first and second portions 108 and 110 can form an annular ring with a central axis 114.

Referring to FIG. 2, in an embodiment, the first portion 108 of the housing 102 can be coupled with a first seal element 116 and the second portion 110 of the housing 102 can be coupled with a second seal element 118. The first portion 108 of the housing 102 and first seal element 116 can engage with the second portion 110 of the housing 102 and the second seal element 118 at an engagement interface 120. In an embodiment, the engagement interface 120 can be generally planar. The engagement interface 120 can lie along a plane extending radially from the central axis 114. In an embodiment, the first and second seal elements 116 and 118 can contact one another along the engagement interface 120. In another embodiment, the first and second portions 108 and 110 of the housing 102 can contact one another along the engagement interface 120.

In an embodiment, the housing 102 can include a rigid material adapted to remain approximately fully unchanged during normal operating conditions of the seal assembly 100. For instance, the housing 102 can include one or more metals or alloys, rigid polymers, or combinations thereof.

The seal 104 can include a polymeric material. Exemplary polymers include tetrafluoroethylene (TFE) such as polytetrafluoroethylene (PTFE), polyvinylidene fluoride (PVDF), perfluoroalkoxy (PFA), polychlorotrifluoroethylene (PCTFE), polyethylenetetrafluoroethylene (ETFE), vinylidene fluoride (THV), polyethylenechlorotrifluoroethylene (ECTFE), polyether ether ketone (PEEK), or any combination thereof. The scope of the disclosure is not intended to be limited to those exemplary polymers listed above. One or more fillers can be included in the seal 104. Exemplary fillers include glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof.

The seal assembly 100 can further include one or more coupling elements adapted to restrict relative movement between the housing 102 and the seal 104. In certain instances, the one or more coupling elements can include discrete coupling elements. In a more particular embodiment, at least one of the coupling elements can include a fastener 122 extending through at least a portion of the housing 102 and at least a portion of the seal 104. The fastener 122 can include, for example, a threaded fastener, a non-threaded fastener, an adhered fastener, or any combination thereof.

Figures 3, 4:
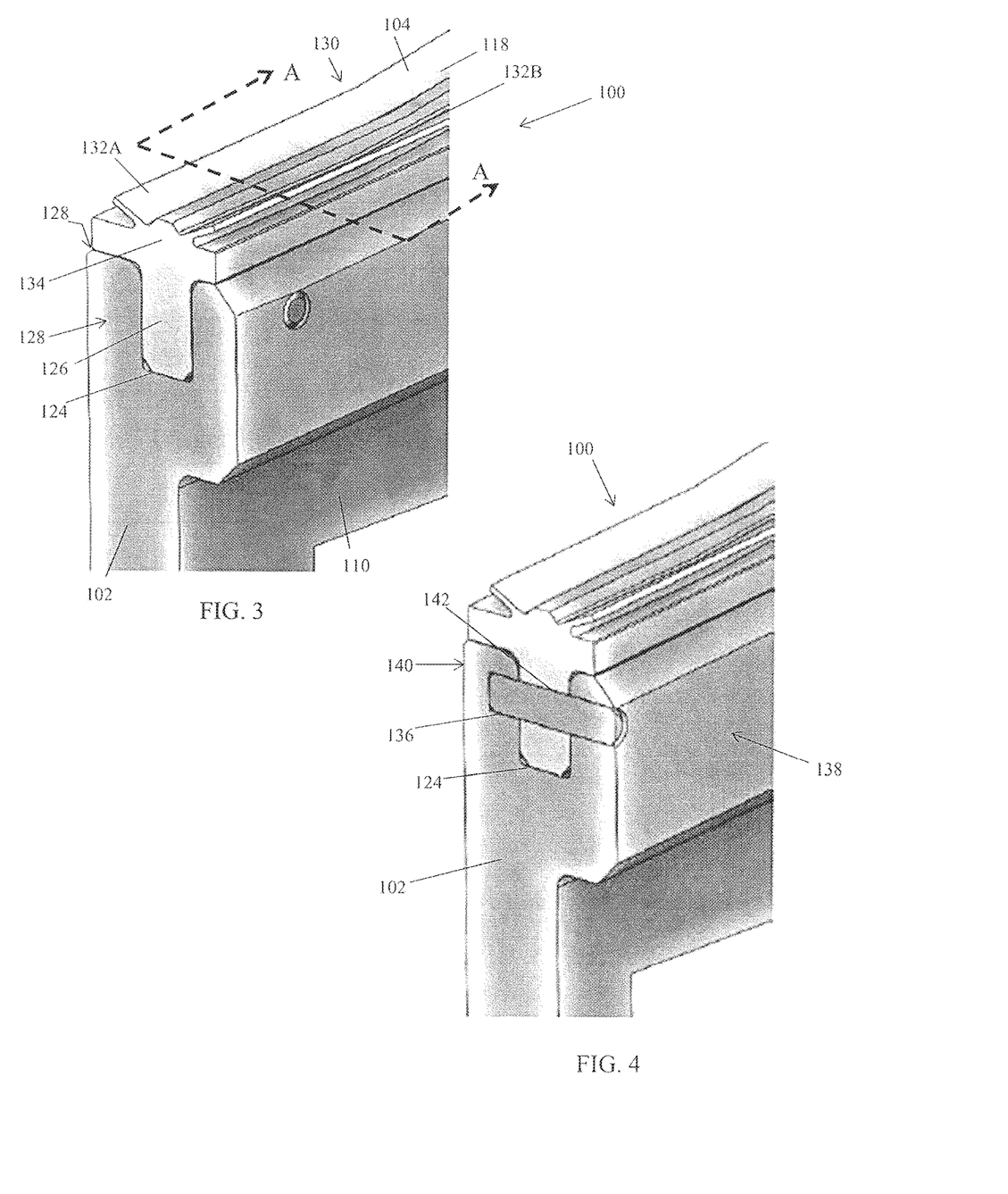
FIG. 3 includes a perspective view of a circumferential end of a portion of a seal assembly in accordance with an embodiment.
FIG. 4 includes a cross-sectional perspective view of a seal assembly in accordance with an embodiment, as seen along Line A-A in FIG. 3.

FIGS. 3 and 4 illustrate a circumferential end 128 of the second portion 110 of the housing 102 and the second seal element 118. The first portion 108 of the housing 102 and the first seal element 116 may be considered a first subassembly of the seal assembly 100. The second portion 110 of the housing 102 and the second seal element 118 may be considered a second subassembly of the seal assembly 100. Reference made herein with respect to either the first or second subassemblies, parts shared by the subassemblies, or components thereof, may be considered to apply only to that subassembly or to either or both subassemblies or overall assembly. In certain instances, the first and second subassemblies can be symmetrical with one another. For example, the first and second subassemblies can be rotationally symmetrical about the central axis 114 of the seal assembly 100, reflectively symmetrical (e.g., reflectively symmetrical about the engagement interface 120), or both.

In an embodiment, the second seal element 118 can define a relaxed circumferential length, $L_{SR}$, as measured by a circumferential length of the second seal element 118 in a relaxed state, that is different than a circumferential length, $L_G$, of a groove 124 in the second portion 110 of the housing 102 in which the second seal element 118 is disposed. In an embodiment, $L_{SR}$ can be greater than $L_G$. For instance, $L_{SR}$ can be at least 1.001 $L_G$, at least 1.005 $L_G$, at least 1.01 $L_G$, at least 1.02 $L_G$, at least 1.03 $L_G$, or at least 1.05 $L_G$.

In an embodiment, the circumferential end 128 of the second seal element 118 can extend a distance past the circumferential end 128 of the second portion 110 of the housing 102. In an embodiment, the circumferential end 128 of the second seal element 118 can overhang the circumferential end 128 of the second portion 110 of the housing 102 by at least 0.1 mm, at least 0.2 mm, at least 0.3 mm, at least 0.4 mm, or at least 0.5 mm. In an embodiment, the second seal element 118 can overhang the second portion 110 of the housing 102 on only one circumferential end thereof. In another embodiment, the second seal element 118 can overhang both circumferential ends of the second portion 110 of the housing 102. In a more particular embodiment, the second sealing element 118 can be circumferentially centered relative to the second portion 110 of the housing 102. In such a manner, the circumferential overhang can be approximately equal on both circumferential ends 128 of the subassembly.

In an embodiment, the groove 124 can extend from a radially inner surface 128 of the housing 102. In an embodiment, the groove 124 can have a uniform profile as measured around the circumference of the housing 102. In another embodiment, the groove 124 can have a variable profile. The seal 104 can include a tail 126 disposed at least partially within the groove 124.

The sealing edge 130 of the seal 104 can include a cross-sectional profile adapted to provide effective sealing characteristics against an inner component (not illustrated). In the illustrated embodiment, the seal 104 defines dual lips 132A and 132B connected at a hub 134. In a particular embodiment, the lips 132A and 132B can be reflectively, or generally reflectively, symmetrical about a centerline of the seal 104. The sealing edge 130 is not intended to be limited to the illustrated or above-described embodiments. In another embodiment, the sealing edge can be non-reflectively symmetrical, include one or more additional features, or include only one lip or no hub.

FIG. 4 includes a cross-sectional view of the seal assembly 100 as seen along Line A-A in FIG. 3. In an embodiment, the housing 102 can define a bore 136 extending from a surface on a first axial end 138 of the housing 102 in a direction toward a second axial end 140 thereof. In an embodiment, the bore 136 can define a depth less than an axial length of the housing 102. That is, the bore 136 can terminate within the housing 102. In a particular embodiment, the housing 102 can define an axial length, $L_{HA}$, and the bore 136 can define a depth, $D_B$, less than 0.99 $L_{HA}$, less than 0.95 $L_{HA}$, less than 0.9 $L_{HA}$, less than 0.8 $L_{HA}$, less than 0.7 $L_{HA}$, less than 0.6 $L_{HA}$, or less than 0.5 $L_{HA}$. In another particular embodiment, $D_B$ can be no less than 0.2 $L_{HA}$, no less than 0.3 $L_{HA}$, or no less than 0.4 $L_{HA}$.

As illustrated, the bore 136 can be in fluid communication with the groove 124 of the housing 102. In such a manner, the coupling element 122 can pass through the bore 136 and extend through at least a portion of a volume defined by the groove 124 in which the seal 104 is disposed. In another embodiment, the bore 136 can define a central axis oriented generally perpendicular with a depth, $D_G$, of the groove 124, as measured from the radially inner surface 128. In yet a further embodiment, the bore 136 can be angularly offset from the depth, $D_G$, of the groove 124. For instance, the central axis of the bore 136 can define a relative angle with the depth, $D_G$, in a range of 1° and 89°, in a range of 5° and 80°, or in a range of 10° and 70°.

In an embodiment, the bore 136 can be coaxially aligned with a bore 142 in the seal 104. In an embodiment, the bore 142 can pass through the tail 126 portion of the seal 104. The bore 142 can define a diameter adapted to receive the coupling element 122. In a particular embodiment, the bore 142 can define a same, or similar diameter as the bore 136 in the housing 102. The coupling element 122 can be installed within the bore 136 of the housing 102 and pass into the bore 142 of the seal 104. In an embodiment, the coupling element 122 can further pass into the bore 136 of the housing 102 on the opposite side of the seal 104. The coupling element 122 can terminate within the housing 102 so as to prevent fluid egress through the bores 136 and 142 during operational use. In an embodiment, the coupling element 122 can be disposed entirely within an area defined between the first and second axial ends 138 and 140 of the housing 102. In another embodiment, a portion of the coupling element 122 can be exposed from the first axial end 138 of the housing 102.

In an embodiment, the coupling element 122 can include a plurality of coupling elements. For instance, the coupling element 122 can include at least two coupling elements, at least three coupling elements, or at least four coupling elements. In an embodiment, the coupling elements 122 can each be disposed within a bore extending at least partially through the housing 102 and seal 104 (e.g., each coupling element 122 can extend through a bore 136 in the housing 102 and a bore 142 in the seal 104). In certain instances, the coupling elements 122 are disposed adjacent to the circumferential ends 128 of the subassemblies.

FIG. 1 illustrates a seal assembly utilizing a plurality of coupling elements 122. The coupling elements 122 are disposed adjacent to circumferential ends of the subassemblies. In an embodiment, the coupling element 122 can be disposed closer to the circumferential ends 128 of the second portion 110 of the housing 102 and second seal element 118 than a middle portion thereof. For example, in a particular embodiment, the second portion 110 of the housing 102 and second seal element 118 can define a circumferential length, $L_H$, as measured by an average circumferential length in the installed state. A first coupling element 122 can be disposed at a first location between 0.0 $L_H$ and 0.2 $L_H$, and a second coupling element 122 can be disposed at a second location between 0.8 $L_H$ and 1.0 $L_H$. In a more particular embodiment, the first location can be disposed between 0.01 $L_H$ and 0.2 $L_H$, and the second location can be disposed between 0.8 $L_H$ and 0.99 $L_H$. In such a manner, the coupling elements 122 can be spaced apart from the circumferential ends 128 of the subassemblies but disposed adjacent thereto. In nonillustrated embodiments, the coupling elements 122 can include other engagement elements configured to engage the housing 102 and seal 104 portions of the subassembly together.

Seal assemblies 100 described in accordance with embodiments herein may be formed in various ways. One exemplary method includes installing a sealing element into a groove defined by a housing and coupling the sealing element to the housing to restrict relative movement between the housing and the sealing element. The method can further include sizing the sealing element after coupling the sealing element to the housing. Sizing can include, for example, cutting, trimming, skiving, or otherwise removing excess material from the sealing element. Sizing the sealing element after coupling it to the housing can permit exact dimensioning of the sealing element relative to the specific housing. In such a manner, seal element overhang can be precisely controlled without using expensive and time consuming tooling and processing.

In an embodiment, the seal assembly 100 can include a split seal having two portions (e.g., two halves) engaged together in use to provide effective sealing characteristics. Each portion can include a subassembly defined by a portion of the seal and a portion of the housing. In a particular embodiment, the first and second subassemblies can have the same or generally same characteristics as compared to one another (e.g., same circumferential lengths). In an embodiment, the first and second subassemblies can be formed similar to one another. In another embodiment, the first and second assemblies can be formed using different methods.

In certain instances, the sealing element can be installed within the groove by press fitting. In other instances, the sealing element can be slid into the groove. The seal can have a circumferential length greater than a circumferential length of the housing. In an embodiment, the circumferential length of the sealing element is at least 10 mm greater than the circumferential length of the housing, at least 15 mm greater than the circumferential length of the housing, at least 20 mm greater than the circumferential length of the housing, at least 30 mm greater than the circumferential length of the housing, at least 40 mm greater than the circumferential length of the housing, or at least 50 mm greater than the circumferential length of the housing. In another embodiment, the circumferential length of the sealing element is no greater than 100 cm greater than the circumferential length of the housing.

In an embodiment, a bore is formed in the housing prior to installing the sealing element therein. After installing the sealing element into the groove, the bore can be passed through the sealing element. That is, for instance, the bore in the sealing element can be formed in situ. In another embodiment, the bore within the housing and the bore within the sealing element can be formed at a same time as one another.

A coupling element can be installed within the bore to couple the sealing element and housing together. The coupling element can include, for example, a fastener. The fastener can be inserted into the bore and passed into the seal assembly so that the sealing element is secured to the housing. In an embodiment, a threaded fastener such as a pinol screw, may be used. The housing or seal may include threads or other complementary engagement features adapted to interface with the fastener to secure the fastener thereto. In an embodiment, the fastener can further be adhered to the housing or seal to prevent extrusion therefrom.

The sealing element can be sized after being coupled to the housing. Sizing may involve removing an exposed edge of the sealing element in successive passes (e.g., by a blade, laser, or other material removing device), or in one single pass. In certain instances, the circumferential length of the sealing element can remain greater than the circumferential length of the housing after sizing is completed. In such a manner, the sealing elements of the subassemblies can be pressed against one another in interference so as enhance fluidic sealing.

Seal assemblies 100 in accordance with embodiments described herein may avoid issues from shrinking caused by temperature gradients experienced in certain working environments, such as within crankshaft housings. More particularly, seal assemblies 100 in accordance with embodiments described herein may permit split ring sealing without incurring leakage typically experienced by split seal designs.

Over time, seals can degrade (particularly those seals in hostile environments subject to high wear or corrosive fluids) and need to be replaced. In certain instances, replacement can be difficult utilizing the original seal, as the geometry of the nearby environment may prohibit certain installation techniques. For example, during initial assembly the seal may have been installed through an action or step that is no longer possible due to further assembly of the nearby environment. By way of a non-limiting example, the initial assembly environment of a crankshaft housing may have permitted axial displacement of a seal into position along a shaft. However, replacement of the seal may require lateral translation as axial ends of the shaft have become inaccessible. Seal assemblies 100 in accordance with one or more embodiments described herein can be adapted to be installed relative to an inner component without requiring axial displacement of the seal along the inner component. In a particular embodiment, seal assemblies 100 in accordance with embodiments described herein can be installed transversely using a two piece housing and seal coupled together in situ.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A seal assembly comprising:
a housing defining a groove;
a seal disposed in the groove of the housing; and
a coupling element adapted to restrict relative movement between the housing and the seal.

Embodiment 2

The seal assembly of embodiment 1, wherein the seal assembly comprises a split seal assembly, and wherein the housing and seal comprise a portion of the split seal assembly.

Embodiment 3

The seal assembly of any one of the preceding embodiments, wherein the seal assembly comprises a first portion and a second portion, and wherein the first and second portions define the same circumferential lengths as compared to one another.

Embodiment 4

The seal assembly of any one of the preceding embodiments, wherein the seal defines a relaxed circumferential length, $L_{SR}$, and the groove defines a circumferential length, $L_G$, and wherein $L_S$ is greater than $L_G$.

Embodiment 5

The seal assembly of embodiment 4, wherein $L_{SR}$ is at least 0.1 mm greater than $L_G$, at least 0.2 mm greater than $L_G$, at least 0.5 mm greater than $L_G$, or at least 1 mm greater than $L_G$.

Embodiment 6

The seal assembly of any one of embodiments 2-5, wherein the seal is circumferentially centered relative to the housing.

Embodiment 7

The seal assembly of any one of the preceding embodiments, wherein the groove is disposed on a radially inner surface of the housing, and wherein an inner diameter of the seal assembly is defined by the seal.

Embodiment 8

The seal assembly of any one of the preceding embodiments, wherein the coupling element is disposed within a bore of the housing, and wherein the bore defines a depth less than an axial length of the housing.

Embodiment 9

The seal assembly of embodiment 8, wherein the bore extends from a first axial end of the housing in a direction toward a second axial end of the housing.

Embodiment 10

The seal assembly of any one of embodiments 8 and 9, wherein the bore is in fluid communication with the groove of the housing.

Embodiment 11

The seal assembly of any one of embodiments 8-10, wherein the bore defines a central axis oriented generally perpendicular with a depth of the groove.

Embodiment 12

The seal assembly of any one of embodiments 8-11, wherein the coupling element is further disposed in a bore of the seal.

Embodiment 13

The seal assembly of any one of embodiments 8-12, wherein the housing comprises a first portion defining circumferential ends spaced apart by a circumferential length of the first portion, and wherein the bore is disposed closer to the circumferential end of the first portion than a middle portion thereof.

Embodiment 14

The seal assembly of any one of the preceding embodiments, wherein the coupling element comprises a plurality of coupling elements including a first coupling element and a second coupling element.

Embodiment 15

The seal assembly of embodiment 14, wherein the first coupling element is disposed adjacent to a first circumferential end of the housing and wherein the second coupling element is disposed adjacent to a second circumferential end of the housing.

Embodiment 16

The seal assembly of any one of embodiments 14 and 15, wherein the housing defines a circumferential length, $L_H$, wherein the first coupling element is disposed at a first location between 0.0 $L_H$ and 0.2 $L_H$, and wherein the second coupling element is disposed at a second location between 0.8 $L_H$ and 1.0 $L_H$.

Embodiment 17

The seal assembly of any one of the preceding embodiments, wherein the coupling element comprises a threaded fastener.

Embodiment 18

The seal assembly of any one of the preceding embodiments, wherein the seal comprises a polymeric material.

Embodiment 19

The seal assembly of any one of the preceding embodiments, wherein the housing comprises a rigid material, such as a metal or alloy.

Embodiment 20

A seal assembly comprising:
a split housing comprising:
  a first portion; and
  a second portion, wherein the first and second portions each define a groove;
a split seal comprising:
  a first seal element disposed in the groove of the first portion of the split housing; and
  a second seal element disposed in the groove of the second portion of the split housing;
a first coupling element adapted to restrict relative movement between the first portion of the split housing and the first seal element of the split seal; and
a second coupling element adapted to restrict relative movement between the second portion of the split housing and the second seal element of the split seal.

Embodiment 21

The seal assembly of embodiment 20, wherein the first and second portions of the split housing define same circumferential lengths as compared to one another.

Embodiment 22

The seal assembly of any one of embodiments 20 and 21, wherein the first seal element defines a relaxed circumferential length, $L_{SR}$, and an effective circumferential length, $L_{SE}$, as measured when the seal assembly is in use, and wherein $L_{SR}$ is greater than $L_{SE}$.

Embodiment 23

The seal assembly of any one of embodiments 20-22, wherein the groove is disposed on radially inner surfaces of the first and second halves of the split housing.

Embodiment 24

The seal assembly of any one of embodiments 20-23, wherein the first and second seal elements have same dimensions as compared to one another.

Embodiment 25

The seal assembly of any one of embodiments 20-24, wherein the first and second portions of the split housing are coupled together by one or more fasteners.

Embodiment 26

A method of forming a seal comprising:
installing a sealing element into a groove defined by a housing;
coupling the sealing element to the housing to restrict relative movement between the housing and sealing element; and
sizing the sealing element after coupling the sealing element to the housing.

Embodiment 27

The method of embodiment 26, wherein installing the sealing element into the groove is performed by press fitting.

Embodiment 28

The method of any one of embodiments 26 and 27, wherein coupling the sealing element to the housing is performed by a coupling element, such as a threaded fastener.

Embodiment 29

The method of embodiment 28, wherein coupling the sealing element to the housing is performed by positioning the entire coupling element within a volume defined by an outer diameter of the housing.

Embodiment 30

The method of any one of embodiments 26-29, wherein coupling the sealing element to the housing further comprises:
forming a bore in the housing; and
forming a bore in the sealing element.

Embodiment 31

The method of embodiment 30, wherein forming the bores in the housing and sealing element occurs at a same time or different times.

Embodiment 32

The method of any one of embodiments 30 and 31, wherein forming the bore in the housing is performed prior to installing the sealing element into the groove.

Embodiment 33

The method of any one of embodiments 30-32, wherein forming the bore in the sealing element is performed after installing the sealing element into the groove.

Embodiment 34

The method of any one of embodiments 30-33, wherein the bore in the housing is approximately the same diameter as the bore in the sealing element.

Embodiment 35

The method of any one of embodiments 30-34, wherein forming the bore in the housing is performed such that a depth of the bore is less than an axial length of the housing.

Embodiment 36

The method of any one of embodiments 30-35, wherein forming the bore in the housing comprises forming a plurality of bores in the housing.

Embodiment 37

The method of embodiment 36, wherein the plurality of bores define approximately same depths as compared to one another.

Embodiment 38

The method of any one of embodiments 36 and 37, wherein the seal comprises a split seal including a first half and a second half, and wherein the plurality of bores includes a first bore disposed adjacent to a first circumferential end of the first half and a second bore disposed adjacent to a second circumferential end of the first half.

Embodiment 39

The method of any one of embodiments 26-38, wherein sizing the sealing element comprises cutting exposed ends of the sealing element.

Embodiment 40

The method of any one of embodiments 26-39, wherein the seal comprises a split seal including a first half and a second half, and wherein the sealing element of the first half defines a circumferential length greater than a circumferential length of the housing of the first half, as measured after sizing the sealing element.

Embodiment 41

The method of embodiment 40, wherein the sealing element defines at least one exposed portion extending circumferentially beyond the housing, the exposed portion having a circumferential length of at least 0.1 mm, at least 0.2 mm, at least 0.3 mm, at least 0.4 mm, or at least 0.5 mm.

Embodiment 42

The method of any one of embodiments 26-41, further comprising engaging a first circumferential half of the seal with a second circumferential half of the seal after sizing the sealing element.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:

1. A seal assembly comprising:
a housing defining a groove;
a seal disposed in the groove of the housing; and
a coupling element adapted to restrict relative movement between the housing and the seal, wherein the coupling element is disposed within a bore of the housing and in a bore of the seal, and wherein the bore of the seal passes through an entirety of a tail portion of the seal.

2. The seal assembly of claim 1, wherein the seal assembly comprises a split seal assembly, and wherein the housing and seal comprise a portion of the split seal assembly.

3. The seal assembly of claim 1, wherein the seal assembly comprises a first portion and a second portion, and wherein the first and second portions define the same circumferential lengths as compared to one another.

4. The seal assembly of claim 1, wherein the seal defines a relaxed circumferential length, $L_{SR}$, and the groove defines a circumferential length, $L_G$, and wherein $L_{SR}$ is greater than $L_G$.

5. The seal assembly of claim 1, wherein the groove is disposed on a radially inner surface of the housing, and wherein an inner diameter of the seal assembly is defined by the seal.

6. The seal assembly of claim 1, wherein the bore defines a depth less than an axial length of the housing.

7. The seal assembly of claim 6, wherein the bore is in fluid communication with the groove of the housing.

8. The seal assembly of claim 6, wherein the bore defines a central axis oriented generally perpendicular with a depth of the groove.

9. The seal assembly of claim 6, wherein the coupling element is further disposed in the bore of the seal.

10. The seal assembly of claim 1, wherein the coupling element comprises a plurality of coupling elements including a first coupling element and a second coupling element.

11. The seal assembly of claim 10, wherein the first coupling element is disposed adjacent to a first circumferential end of the housing and wherein the second coupling element is disposed adjacent to a second circumferential end of the housing.

12. A seal assembly comprising:
  a split housing comprising:
    a first portion; and
    a second portion, wherein the first and second portions each define a groove;
  a split seal comprising:
    a first seal element disposed in the groove of the first portion of the split housing; and
    a second seal element disposed in the groove of the second portion of the split housing;
  a first coupling element adapted to restrict relative movement between the first portion of the split housing and the first seal element of the split seal; and
  a second coupling element adapted to restrict relative movement between the second portion of the split housing and the second seal element of the split seal, wherein the coupling element is disposed within a bore of the housing and in a bore of the seal, and wherein the bore of the seal passes through an entirety of a tail portion of the seal.

13. The seal assembly of claim 12, wherein the first seal element defines a relaxed circumferential length, $L_{SR}$, and an effective circumferential length, $L_{SE}$, as measured when the seal assembly is in use, and wherein $L_{SR}$ is greater than $L_{SE}$.

14. A method of forming a seal comprising:
  installing a sealing element into a groove defined by a housing;
  coupling the sealing element to the housing to restrict relative movement between the housing and sealing element to form a seal assembly; and
  sizing the sealing element after coupling the sealing element to the housing,
  wherein the coupling element is disposed within a bore of the housing and in a bore of the seal, and wherein the bore of the seal passes through an entirety of a tail portion of the seal.

15. The method of claim 14, wherein coupling the sealing element to the housing is performed by a coupling element.

16. The method of claim 15, wherein coupling the sealing element to the housing is performed by positioning the entire coupling element within a volume defined by an outer diameter of the housing.

17. The method of claim 14, wherein coupling the sealing element to the housing further comprises:
  forming a bore in the housing; and
  forming a bore in the sealing element.

18. The method of claim 14, wherein the seal comprises a split seal including a first half and a second half, and wherein the plurality of bores includes a first bore disposed adjacent to a first circumferential end of the first half and a second bore disposed adjacent to a second circumferential end of the first half.

* * * * *